United States Statutory Invention Registration [19]

[11] Reg. Number: H886

George [43] Published: Feb. 5, 1991

[54] REINFORCED POLYMER

[75] Inventor: Eric R. George, Houston, Tex.

[73] Assignee: Shell Oil Company, Houston, Tex.

[21] Appl. No.: 289,157

[22] Filed: Dec. 23, 1988

Related U.S. Application Data

[63] Continuation-in-part of Ser. No. 137,688, Dec. 24, 1987, abandoned.

[51] Int. Cl.[5] ..... C08J 3/20; C08K 3/40; C08L 29/12

[52] U.S. Cl. ..... 524/612; 524/592

[58] Field of Search ..... 524/612; 528/392

[56] References Cited

U.S. PATENT DOCUMENTS

| | | | |
|---|---|---|---|
| 2,495,286 | 1/1950 | Brubaker et al. | 260/63 |
| 3,694,412 | 9/1972 | Nozaki | 260/63 CQ |
| 3,929,727 | 12/1975 | Russell et al. | 260/48.95 F |
| 3,948,832 | 4/1976 | Hudgin | 260/23 EP |
| 3,948,850 | 4/1976 | Hudgin | 260/45.7 P |
| 3,948,873 | 4/1976 | Hudgin . | |
| 3,968,082 | 7/1976 | Hudgin | 260/45.85 H |
| 3,979,367 | 9/1976 | Kiovsky et al. | 528/374 |
| 3,979,373 | 9/1976 | Kiovsky et al. . | |
| 3,979,374 | 9/1976 | Kiousky et al. | 525/375 |
| 4,024,104 | 5/1977 | Russell et al. | 260/45.8 R |
| 4,070,532 | 1/1978 | Hammer | 526/11.2 |
| 4,139,522 | 2/1979 | Lantor | 260/47.75 R |
| 4,616,072 | 10/1986 | White | 525/189 |
| 4,699,857 | 10/1987 | Giovannoni et al. . | |

FOREIGN PATENT DOCUMENTS

| | | |
|---|---|---|
| 0121965 | 10/1984 | European Pat. Off. . |
| 0181014 | 5/1986 | European Pat. Off. . |
| 0229408 | 7/1987 | European Pat. Off. . |
| 1081304 | 8/1967 | United Kingdom . |
| 2111513 | 7/1983 | United Kingdom . |

OTHER PUBLICATIONS

Tensile and Impact Strengths of Unidirectional, Short Fibre-Reinforced Thermoplastics, Composites, 1979, 111-19.

Mechanical Properties of Particulate Filled Polymers, Polymer Composites, 1987, 8(2), 115-22.

The Role of Aminosilanes on the Adhesion Promotion at the E-Glass/Poly-(Butylene Terephthalate) Interface, Session 21-D, The Society of Plastics Industry, Inc., Feb. 2-6, 1987.

Polymeric Silanes: An Evolution in Coupling Agents, Session 21-C; The Society of Plastics Industry, Inc., Feb. 2-6, 1987.

Adhesion Enhancing Additives for Silane Coupling Agents, Session 21-E; The Society of Plastics Industry, Inc., Feb. 2-6, 1987.

Ceramic Fiber: A New Alternative Short Fiber Reinforcement, The Society of Plastics Industry, Inc., Feb. 2-6, 1987.

Fiberfrax® Product Specifications Brochures of the Sohio Engineered Materials Company.

*Primary Examiner*—John S. Maples
*Assistant Examiner*—Philip Tucker

[57] ABSTRACT

Polymer compositions comprising linear alternating polymers of carbon monoxide and at least one ethylenically unsaturated hydrocarbon and an amount of glass fiber reinforcement.

9 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REINFORCED POLYMER

This is a continuation-in-part of U.S. Ser. No. 137,688, now abandoned, filed Dec. 24, 1987.

FIELD OF THE INVENTION

This invention relates to certain polymer compositions having improved mechanical properties. More particularly, the invention relates to compositions comprising a linear alternating polyketone polymer reinforced with glass fibers.

BACKGROUND OF THE INVENTION

Polymers of carbon monoxide and olefinically unsaturated organic compounds, or polyketones, have been known and available in limited quantities for many years. For example, polymers of ethylene or ethylene-propylene which contain small quantities of carbon monoxide are disclosed in U.S. Pat. No. 2,495,286, prepared using free radical catalysts. British Patent No. 1,081,304 discloses polymers containing higher concentrations of carbon monoxide prepared using alkylphosphine complexes of palladium salts as catalysts. U.S. Pat. No. 3,948,873 issued to Hudgin, discloses a method of preparing ethylene-carbon monoxide copolymers using organic peroxide catalysts. The method involves polymerization of the monomers in the presence of a small amount of potassium dihydrogen phosphate.

U.S. Pat. No. 4,143,096 issued to Hudgin discloses graft interpolymers comprised of a polyolefin backbone polymer prepared from at least one alpha-olefin of two to four carbon atoms onto which is graft a copolymerized mixture of ethylene and carbon monoxide.

A special class of linear polyketones is disclosed in U.S. Pat. No. 3,694,412, wherein the monomer units of carbon monoxide and olefinically unsaturated hydrocarbons occur in alternating order.

Polyketones are of considerable interest because they exhibit good physical properties. In particular, the high molecular weight linear alternating polymers have potential use as engineering thermoplastic due to their high strength, rigidity and impact resistance. These polymers can be represented by the general formula $$-\overset{\overset{\displaystyle O}{\|}}{C}-(A)-$$

wherein A is the moiety obtained by polymerization of the olefinically unsaturated organic compound through the olefinic unsaturation. A general process for preparing such linear alternating polymers is disclosed, for example, in published European Patent Application 121,965 and 181,014. The process generally comprises contacting the monomers in the presence of a catalyst obtained from a compound of palladium, cobalt or nickel, the anion of a non-hydrohalogenic acid having a pKa less than about 2, and a bidentate ligand of phosphorus, arsenic or antimony. The resulting linear alternating polymers are generally high molecular weight thermoplastic polymers having utility in the production of articles for food and drink containers and for automobile parts.

Although the properties of the polyketones are suitable for many applications, it would be of advantage to provide polyketone compositions which exhibit less mold shrinkage and certain mechanical properties that are improved over the corresponding properties of the polymer alone.

SUMMARY OF THE INVENTION

This invention relates to improved polymer compositions comprising an amount of a linear alternating polymer of carbon monoxide and at least one ethylenically unsaturated hydrocarbon and an amount of glass fiber reinforcement.

DESCRIPTION OF THE INVENTION

The polymers which are incorporated in the compositions of the invention are those linear alternating polyketones produced from carbon monoxide and at least one ethylenically unsaturated hydrocarbon. Suitable ethylenically unsaturated hydrocarbons for production of polyketones through polymerization with carbon monoxide are hydrocarbons of from 2 to 20 carbon atoms inclusive, preferably of up to 10 carbon atoms inclusive, and are aliphatic including ethylene and other alpha-olefins such as propylene, butene-1, isobutylene, octene-1 and dodecene-1, or are arylaliphatic containing an aryl substituent on an otherwise aliphatic molecule, particularly an alpha-olefin containing an aryl substituent on a carbon atom of the ethylenic unsaturation. Illustrative of this latter class are styrene, p-methylstyrene, m-ethylstyrene and p-propylstyrene. Preferred polyketone polymers for use in the compositions of the invention are copolymers of carbon monoxide and ethylene or terpolymers of carbon monoxide, ethylene and a second alpha-olefin of 3 or more carbon atoms, particularly propylene.

Of particular interest are the polyketones of molecular weight from about 1000 to about 200,000 especially those polymers of molecular weight from about 10,000 to about 50,000 and containing substantially equimolar quantities of carbon monoxide and ethylenically unsaturated hydrocarbon.

A method of producing polyketone polymers which is now becoming conventional is to contact the carbon monoxide and the ethylenically unsaturated hydrocarbon(s) under polymerization conditions in the presence of a catalyst formed from a metal compound of palladium, cobalt or nickel, an anion of a non-hydrohalogenic acid having a pKa less than about 6, preferably less than about 2, and certain bidentate ligands of nitrogen or of phosphorus, arsenic or antimony. Although the scope of the polymerization process is extensive, for purposes of illustration of a preferred method of producing the polyketone polymer, the metal compound is palladium acetate, the anion is the anion of trifluoroacetic acid or para-toluenesulfonic acid and the bidentate ligand is selected from 1,3-bis(diphenylphosphino)propane and 1,3-bis[di(2-methoxyphenyl)phosphino]propane.

Polymerization is typically carried out at elevated temperature and pressure in the gaseous phase in the substantial absence of reaction diluent or in the liquid phase in the presence of a reaction diluent such as a lower alkanol, e.g., methanol or ethanol. Suitable reaction temperatures are from about 20° C. to about 150° C. with preferred temperatures being from about 50° C. to about 125° C. The reaction pressure will typically be from about 1 bar to about 200 bar, preferably from about 10 bar to about 100 bar. The reactants and catalyst are contacted by conventional methods such as shaking or stirring and subsequent to reaction the polymer product is recovered as by filtration of decantation.

The polymer product will, on occasion, contain metal or other residues of the catalyst which are removed, if desired, by treatment of the polymer product with a complexing agent or solvent which is selective for the residues. Production of this class of polymers is illustrated, for example, by published European Patent Application Nos. 181,014 and 121,965 and by copending U.S. patent application Ser. No. 935,431, filed Nov. 14, 1986.

The physical properties of the polymer and the compositions of the invention will be in part determined by the molecular weight of the polymer, whether the polymer is a copolymer or terpolymer and which unsaturated hydrocarbons have been employed in its production. Suitable linear alternating polyketones for use in the invention have limiting viscosity numbers (LVN) as measured in m-cresol at 60° C., using a standard capillary viscosity measuring device, in the range of about 0.5 to about 10 LVN, more preferably from about 0.8 to about 4 LVN and most preferably from about 1.1 to about 2.5. Typical melting points of the polyketone polymers are from about 175° C. to about 300° C., more frequently from about 210° C. to about 260° C.

The structure of the polymer in the preferred modifications is that of a linear alternating polymer of units of carbon monoxide and ethylene and carbon monoxide and any second ethylenically unsaturated hydrocarbon if present. The preferred polyketone polymers contain substantially one carbon monoxide moiety for each moiety of unsaturated hydrocarbon. When terpolymers are produced from carbon monoxide, ethylene and a second ethylenically unsaturated hydrocarbon, i.e., an alpha-olefin of at least 3 carbon atoms such as propylene, there will be at least about 2 units incorporating a moiety of ethylene per unit incorporating a moiety of the second ethylenically unsaturated hydrocarbon. Preferably, there are from about 10 to about 100 units incorporating a moiety of ethylene per unit incorporating a moiety of the second ethylenically unsaturated hydrocarbon. The preferred class of polyketone polymers is therefore characterized by a polymer chain of the formula $$\left[\overset{O}{\overset{\|}{C}}\left(C_2H_4\right)\right]_x\left[\overset{O}{\overset{\|}{C}}\left(B\right)\right]_y \qquad \text{I}$$

wherein B is the moiety obtained by the polymerization of the second ethylenically unsaturated hydrocarbon of at least 3 carbon atoms through the ethylenic unsaturation. By way of further illustration, when the second ethylenically unsaturated hydrocarbon is propylene, and B moiety will be $$\left(CH_2-CH(CH_3)\right) \text{ or } \left(CH(CH_3)-CH_2\right)$$

depending upon the stereochemistry of the polymerization. The polyketone terpolymers of the invention may contain both types of B moiety randomly occurring along the polymer chain. The $$-\overset{O}{\overset{\|}{C}}\left(C_2H_4\right)-$$

units and the $$-\overset{O}{\overset{\|}{C}}\left(B\right)-$$

units will also occur randomly throughout the polymer chain although the ratio of y:x in the above formula I will be no more than 0.5. In the modification of the invention which employs copolymers of carbon monoxide and ethylene without the presence of a second ethylenically unsaturated hydrocarbon, the polymers are represented by the above formula I wherein Y is zero. When y is other than 0, terpolymers are employed, ratios of y:x from about 0.01 to about 0.1 are preferred.

The linear alternating polyketones described by the above formula I will have end groups or "caps" which depend upon the particular components present during polymerization and whether and how the polymer is processed during any subsequent purification. The precise nature of such end groups or "caps" is not critical with regard to overall properties of the polymer, however, and the polymeric polyketones are fairly depicted through use of the polymer chain as depicted above.

The polymer compositions of the invention comprise the above polyketone polymers incorporating uniformly therein a minor proportion, relative to the polymer, of fibrous glass reinforcement.

Reference exist which teach that many types of fillers can be added to engineering thermoplastics, see the article titled "Tensile And Impact Strengths Of Unidirectional, Short Fibre-Reinforced Thermoplastics", F. Ramsteiner and R. Theysohn, *Composites,* 1979, pp. 111–119. However these references do not teach adding glass to the specific novel linear alternating polyketone of the present invention.

The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is produced is the more common alkali metal silicate glass, particularly a sodium silicate glass. Fibers produced of such glass are conventional and are commercially available from a number of U.S. and foreign glass companies. The fibers are useful as reinforcements for polymeric products and are commonly used as such. However, the physical dimensions of the glass fibers are of some importance to successful utilization in a particular application as are the presence or absence of a sizing material or a coupling agent for the glass and the nature of the sizing or coupling agent.

In the polyketone/glass fiber bend compositions of the invention, the glass fibers which contribute the most desirable properties to the composition are chopped glass fibers of circular cross-section. The fibers range in diameter from about $2\times10^{-4}$ inch to about $8\times10^{-4}$ inch, preferably from about $4\times10^{-4}$ inch to about $7\times10^{-4}$ inch. Fibers of greater or lesser diameter are satisfactory but fibers of too small a diameter do not provided the desired strength. Fibers of too large a diameter contribute too much weight for the resulting strength and may not be economical. Although in some applications the long continuous fibers of glass are satisfactory, in the compositions of the invention it is preferred to use short fibers of glass. Lengths of glass fiber from about 0.1 inch to about 0.5 inch are suitable. While somewhat longer or somewhat shorter lengths are also useful, too long a glass fiber detracts from the processability of the composition while too short a fiber does not provide the desired strength. It is recognized that the actual length of the glass fibers in the composition will depend to some extent upon the method of blending or mixing the components, as this may mechanically break down the length of the glass fibers.

The glass fibers to be used as reinforcements for plastic materials will customarily be provided by the manufacturer with a coating of a sizing material or a coupling agent, which terms are often used interchangeably. The nature of the sizing or coupling agent will influence the interfacial shear strength of the fiber and the polymer matrix, i.e., the degree to which the polymer and glass fiber will adhere. Improvement in mechanical properties, such as tensile strength, result when a relatively high degree of adhesion occurs between the polymer and the fiber. To contribute strength to a polymer blend, the interfacial shear strength will be at least comparable in magnitude to the shear strength of the polymer so that there will be good adhesion between the polymer and the glass fiber. The interfacial shear strength is influenced by the polarity of the polymer so that for some polymers certain sizings or coupling agents work better than others. For the case of blends containing polyketone polymers a variety of sizings are suitable. Such sizings are generally characterized by the general nature of the size rather than the specific chemical structures which are often proprietary to the glass fiber manufacturer. Suitable sizings include water emulsions of starch and lubricating oil, aqueous dispersions of surface active materials and lubricants, silicon-containing materials such as vinyl silanes, alkyltrimethoxysilanes, amino silanes, trimethoxysilanes which may also contain urethane, acrylate or epoxy functionalities, and non-planar hydrocarbons. For use in the blends of the invention, polar sizings are preferred, such as a sizing having a trimethoxysilane end group attached to a hydrocarbon chain with a terminal urethane functionality, although other hydrocarbon sizings having a trimethoxysilane end group are also guide suitable. Such fibers are commercially available and are exemplified by OCF 492 Fiberglass and OCF 457 Fiberglass which are available from Owens-Corning Fiberglass.

The amounts of glass fiber to be incorporated into the compositions of the invention can vary. Preferably a minor amount of glass fiber relative to the polymer which is present as the major component in the total composition is used. Amounts of glass fiber loading from about 1% by weight to about 45% by weight, based on the total composition, are satisfactory with amounts from about 5% by weight to about 35% by weight, based on the total composition, being preferred.

The method of producing the compositions of the invention is not critical so long as an intimate mixture of the two components is produced without undue degradation of the components or the resulting composition. In one modification the components are dry mixed and converted to a blended composition by application of elevated temperature and pressure. In an alternate modification, the components are passed through an extruder to produce the composition as an extrudate. The components are also usefully blended in a mixer which operates at elevated temperature at high shear.

The compositions of the invention may also include conventional additives such as antioxidants, plasticizers, pigments, stabilizers, other reinforcing components, mold release agents, fire retarding chemicals and other materials which are designed to improve the processability of the polymer or the properties of the resulting composition. Such additives are added together with, prior to or subsequent to the blending of the polymeric and glass fiber components.

The resulting compositions are processed by conventional methods such as injection molding, pressure forming, thermoforming, sheet extrusion and sheet casting which do not serve to degrade the polymer or the composition.

The novel polyketone polymer/glass fiber compositions are uniform blends which exhibit less mold shrinkage and have mechanical properties improved over polymer without glass fiber. The compositions have particular utility in the production of mechanical parts, such as automobile body panels, fenders, etc. particularly those having a large and continuous surface where strength, uniformity and appearance are important.

The compositions of the invention are further illustrated by the following Illustrative Embodiments which should not be construed as limiting.

Preparation of the Linear Alternating Polyketones

A linear alternating terpolymer of carbon monoxide, ethylene and propylene, known hereafter as Sample A, was prepared in the presence of a catalyst formed from palladium acetate, the anion of trifluoroacetic acid, and 1,3-bis(diphenylphosphino)propane. Sample A polymer had a melting point of 222° C. and a limiting viscosity number (LVN) of 1.76 measured at 60° C. in m-cresol.

A second linear alternating terpolymer of carbon monoxide, ethylene and propylene, known hereafter as Sample B, was prepared in similar fashion. Sample B terpolymer had a melting point of 213° C. and an LVN of 1.46 measured at 60° C. in m-cresol.

A third sample polymer, Sample C, was prepared from blending 33% of a first polymer known as 088/005, a linear alternating terpolymer prepared by employing a catalyst composition formed from palladium acetate, the anion of trifluoroacetic acid and 1,3-bis[di(2-methody-phenol)phosphino]propane with a melting point of 220° C. and a limiting viscosity number (LVN) measured in 60° C. meta-cresol of 1.79, with 67% of a second terpolymer, known as polymer 088/006. The second terpolymer, known as polymer 088/006, was a linear alternating terpolymer prepared in a manner identical to the 088/005 polymer. The 088/006 polymer had a melting point of 223° C. and an LVN of 1.62. This neat polymer blend is referred to hereafter as Sample C. The neat polymer blend was formed by dry mixing pellets of the two polymers together in a conventional manner. The tumbled mixture was melt blended in a 30 mm corotating twin screw extruder having seven zones and a total L/D of 27/1. The melt temperature at the die exit was 260° C. in the zone temperatures along the barrel were maintained at 466° F. The blend was devolatized under vacuum (40 in Hg) at the zone adjacent to the die.

Test specimens of Samples A, B, and C were prepared by injection molding the samples into test bars on an injection molder, such as an Engel 8 oz. molder equipped with a 2.2/1 compression ratio screw. The cycle time for the sample was about 10–30 seconds. Standard test specimens were molded into family molds and samples were immediately placed in a dry box. The samples were then tested under conventional ASTM testing conditions and the results of the tests follow in the Tables.

Illustrative Embodiment I

Sample A was blended with OCF 457 and OCF 492 glass fibers (GF), commercially available from Owens-Corning Fiberglass. OCF 457 and OCF 492 are both E type glasses having a density of about 2.60 g/cc. OCF 457 glass is sized with a non-polar sizing agent designed for blending with polypropylene and OCF 492 glass is sized with a polar sizing agent designed for blending with polyesters. The blending was done on a single screw extruder. All samples were extruded into water and pelletized. Pellets were dried prior to molding. Samples were injection molded into standard ASTM tensile bars for testing. Modulus, flex strength and notched izod values were obtained using standard ASTM test methods. The measured values for the molded samples are reported in Table 1.

Sample B of Illustrative Embodiment I was also blended with OCF 457 and 492 glass fibers. The samples of blended Sample B were extruded in a manner identical to those of blended Sample A and then pelletized. The pellets were injection molded into standard ASTM tensile bars for testing. The pellets were not dried prior to molding. The measured values for modulus, flex strength and notched izod for the molded blends of Sample B are reported in Table 2.

Tables 1 and 2 illustrate the increase of modulus with increasing glass content and the corresponding increase in flex strength with glass content for the compositions prepared with OCF 492 and OCF 457. A comparison of the values at constant glass content in either Table 1 or 2 indicates that better properties were obtained using the OCF 492 glass fiber. A comparison of Tables 1 and 2 also illustrates that the magnitude of the increases in mechanical properties depend not only on the glass and type of sizing used, but also on the properties of the neat polyketone. The combination of Sample A having the higher initial starting modulus with OCF 492 glass fibers resulted in the best properties in comparison to other combinations at constant glass content.

TABLE 1

| | | | Notched Izod | |
|---|---|---|---|---|
| [a]GF (% w) | [b]Modulus | [b]Flex Strength | RT | −20° F. |
| 0.0 | 217,000 | 7,100 | 4.3 | 1.1 |
| 9.9* | 304,000 | 10,300 | 2.1 | 0.9 |
| 18.9* | 569,000 | 15,400 | 1.7 | 1.0 |
| 18.9** | 400,000 | 12,100 | 1.6 | 0.9 |

[a]For compositions containing terpolymer sample A
[b]psi
[c]ft-lb/in
*OCF 492 Glass Fibers (polar sizing).
**OCF 457 Glass Fibers (non-polar sizing).

TABLE 2

| | | | Notched Izod | |
|---|---|---|---|---|
| [a]GF (% w) | [b]Modulus | [b]Flex Strength | RT | −20° F. |
| 0.0 | 176,000 | 6,500 | 3.4 | 0.8 |
| 9.9** | 230,000 | 8,300 | 1.7 | 0.8 |
| 18.9** | 299,000 | 9,800 | 1.5 | 0.8 |
| 28.4** | 391,000 | 11,000 | 1.8 | 1.0 |
| 28.4* | 505,000 | 14,200 | 1.5 | 0.9 |

[a]For compositions containing terpolymer sample B
[b]psi
[c]ft-lb/in
*OCF 492 Glass Fibers (polar sizing).
**OCF 457 Glass Fibers (non-polar sizing).

Illustrative Embodiment II

Terpolymer Sample A was blended separately with OCF 457 and OCF 492 glass fibers. The blending was done on a ¾" Brabender single screw extruder and all samples were extruded into water and pelletized. The pellets were dried prior to molding. Samples were injection molded into standard ASTM tensile bars for testing. Modulus, flex strength and notched izod values were obtained using standard ASTM test methods. The molded articles will absorb up to about 1% w of water, which will typically result in a slight decrease in modulus and a slight increase in impact strength. The heat of fusion was measured by differential scanning calorimetry (DSC) and normalized for the weight percent glass added.

A comparison of Tables 1 and 2 with Table 3 illustrates the improvement in properties observed for glass fiber reinforced compositions that are molded on a twin screw extruder (Table 3) versus compositions that were molded on a single screw extruder (Tables 1 and 2).

Table 3 also illustrates the increase of modulus with increasing glass content and the corresponding increase in flex strength with glass content for compositions prepared with OCF 492 glass fibers. The flex strength reached about 20,000 psi at 27.0% w glass loading. This value infers good fiber-matrix adhesion.

Table 3 shows notched izod values at room temperature (RT) and at −20° F. versus glass content for the compositions prepared with OCF 492 and OCF 457 glass. In the RT values, the impact resistance initially decreases for samples having low glass content but the reinforced compositions show a progressive increase in impact resistance with increasing glass content. The low temperature impact resistance increased with increasing glass content reaching a value of about 2.1 ft. lb/in at 27.0% w glass. The heat of fusion versus glass content mimics the room temperature notched izod values (Table 3). The heat of fusion is directly proportional to the degree of crystallinity in polymers. The crystallinity of the compositions increased with increasing glass content which may indicate that the glass acts as a site for nucleation and growth of crystals. This crystallization enhances the adhesion and morphology of the polymer-glass interface leading to improved impact resistance. OCF 457 glass compositions show a higher heat of fusion that equivalent loadings of OCF 492, which indicate a higher crystallinity of the OCF 457 compositions. Consistent with this observation is a comparison of the corresponding values in Table 3 which show that the use of OCF 457 glass leads to higher impact resistance than OCF 492 glass at the same loading.

TABLE 3

| | | [b]Flex | Notched Izod | | [d]Heat of |
|---|---|---|---|---|---|
| [a]GF (% w) | [b]Modulus | Strength | RT | −20° F. | Fusion $H_f$ |
| 0.0 | 205,730 | 7,242 | 4.40 | 1.17 | 22.1 |
| 21.0* | 516,080 | 16,213 | 2.02 | 1.20 | 14.1 |
| 23.6* | 682,450 | 18,961 | 3.11 | 1.71 | 16.91 |
| 27.0* | 739,310 | 20,814 | 3.35 | 2.05 | 18.97 |
| 21.0** | 512,180 | 15,373 | 2.63 | 1.37 | 18.88 |

*OCF 492 Glass Fibers (polar sizing).
**OCF 457 Glass Fibers (non-polar sizing).
[a]For compositions containing terpolymer sample A.
[b]psi
[c]ft-lb/in
[d]cal/g

Illustrative Embodiment III

Terpolymer Sample A was blended separately with 10% by volume of OCF 457 and OCF 492 glass fibers using a Haake 30 mm twin screw extruder. The compositions were pelletized, dried and molded on a 1.5 ounce Arburg injection molder into standard ASTM tensile bars to measure their respective mold shrinkage. Sample A was also injection molded separately as a control. The results of the mold shrinkage measurements are shown in Table 4. The mold shrinkage is significantly decreases upon the addition of the glass fibers. The compositions containing the OCF 492 glass showed less mold shrinkage than the OCF 457 glass composition, which is consistent with the higher heat of fusion (higher crystallinity of the compositions containing OCF 457).

TABLE 4

| % Polymer | Glass Fibers (% volume) | % Mold Shrinkage |
|---|---|---|
| 100 | — | 2.9 |
| 90 | 10[a] | 1.75 |
| 90 | 10[b] | 1.02 |

[a]OCF 457 Glass Fibers (non-polar sizing).
[b]OCF 492 Glass Fibers (polar sizing).

Illustrative Embodiment IV

Polymer Sample C was blended with a 20 wt % blend of glass fibers, known as Owens Corning 492AA available from Owens Corning. Samples of this 20% blend were prepared and sample bars were manufactured in a manner identical to the blend of Illustrative Embodiment III. Tests results follow in Table 5.

Another sample blend was prepared using polymer Sample C and 30% by weight of glass fibers 492AA. This blend was prepared in a manner identical to the 20 wt % blend. Test specimens were prepared as described above and tests were carried out. Those test results also appear in Table 5.

TABLE 5

| GF[5] (% w) | Modulus[1] (psi) | Flex[3] (psi) | Izod[2] (ft-lb/in) | HDT[4] |
|---|---|---|---|---|
| 0.0 | 263,000 | N/A | 3.0 | 205 |
| 20.0 | 548,000 | N/A | 1.9 | 182 |
| 30.0 | 879,000 | 8900 | 2.4 | 193.3 |

[1]ASTM D-790 (0.05 in/min)
[2]ASTM D-256
[3]ASTM D-638 (0.2 in/min)
[4](°F. at 264 psi)
[5]OCF 492AA Glass Fibers It is clear from Table 5 that by adding glass fibers to the novel polyketone, the flexural modulus of the polymer increases. Also, rheology tests reveal that glass fibers affect the viscosity of the novel polymer over time. The presence of the glass fibers accelerates viscosity of the polymer, over time, and such a phenomena is unexpected, for typical reinforced polymer systems.

It is known that the novel polyketone of this invention has different chemical sensitivities to different reinforcing components. More specifically, the novel linear alternating polymer reacts differently when exposed to mica versus mineral fillers, like Kaolin clay, glass fibers, ceramic fibers, calcium carbonate, or mica/glass fiber blends. These differing chemical sensitivities manifest in several distinct areas: (1) differences in flexural modulus (2) differences in tensile strength and notched izod values, (3) differences in processability or cycle time for the polymer, (4) differences in mold shrinkage predictability, (5) differences in heat deflection temperatures, and (6) differences in the ability to resist warpage once molded into an article.

For comparative purposes, three specific "neat" novel polyketones, noted hereafter as Control A, Control B, and Control C were prepared into test specimens.

More specifically, Control A was a specific linear alternating terpolymer prepared in the presence of a catalyst formed from palladium acetate, the anion of a trifluoroacetic acid and 1,3-bis(diphenylphosphino) propane. The polymer had a melting point of 220° C. and a limiting viscosity number of 1.96 as measured at 60° C. in m-cresol.

Control B was a blend of two specific linear alternating polymers. Control B comprised 33% of the novel polyketone polymer 088/005 with 67% of the novel polyketone polymer 088/006. Polymer 088/005 was a linear alternating terpolymer of ethylene and 7 wt % propylene prepared by employing a catalyst composition formed from palladium acetate, the anion of trifluoroacetic acid and 1,3-bis[di(methoxy-phenol)phosphino]propane. Polymer 088/005 had a melting point of 220° C. and a limiting viscosity number (LVN) measured in 60° C. meta-cresol of 1.79. Polymer 088/006 was a linear alternating polymer prepared in a manner identical to the 088/005 polymer. The 088/006 polymer had a melting point of 223° C. and an LVN of 1.62. The neat polymer blend of Control B was formed by dry mixing pellets of the two polymers 088/005 with 088/006 in a conventional manner. The blended mixture was then melt blended in a 30 mm co-rotating twin screw extruder having seven zones and a total L/D of 27/1. The melt temperature at the die exit was 260° C. and the temperatures along the barrel were maintained at 466° F.

Control C was a specific linear alternating polyketone polymer prepared by Shell Oil Company and known as 088/008. Polyketone polymer 088/008 was prepared in the presence of a catalyst formed from palladium acetate, the anion of trifluoroacetic acid and 1,3-bis(diphenyl phosphino) propane. The polymer had a melting point of 223° C. and a limiting viscosity number of 1.73 as measured at 60° C. in m-cresol.

Test specimens of the polymer Control A, B, and C, as well as blends using these Controls were prepared by compounding the polymer on a 30 mm, 27/1 L/D twin screw extruder. The material from the extruder was extruded into water and pelletized. The pellets were dried and injection molded, usually on an Engel (8 oz.) injection molder equipped with a 2.2/1 compression ratio screw. The cycle time for the samples varied depending on the blend combination used in the equipment. The molder formed standard family test specimens, which were then tested using the ASTM tests, noted above.

Controls A, B, and C were evaluated for flexural modulus (in psi), tensile strength (in psi), and Notched Izod in ft-lb/in at room temperature and at −20° F. Additionally, Control B was evaluated for its heat deflection temperature and Control C was evaluated for its mold shrinkage value. Flexural modulus was determined using ASTM D-790. Tensile strength was determined using ASTM D-638. Notched Izod determination was made using ASTM D-256.

It was discovered that these specific reinforcing components provide different values for flex modulus, tensile strength and notched izod. These components appear to act synergistically with the novel polyketone causing definite changes appear in the properties of the polyketone blends.

For example, polymer blends that exhibit the best strength, incorporate the long glass fibers and long ceramic fibers. Good, but not as good as the glass fibers or ceramic fibers are the mica/glass/polyketone blends, Mica, used alone, provides a polymer blend with strength characteristics that are better than the neat polymer control but which are not as good as the mica/glass/polyketone combination. More specifically, high aspect ratio mica platelets provide good strength, but strength which is not quite as good as the glass or ceramic fibers. High aspect ratio mica/polyketone blends are stronger than blends of low aspect platelet particulates with the novel polyketone such as glass flakes. Stubby fibers such as Wollastinite, and Kaolin are not as good as low aspect platelets/polyketone blends for improved strength but they are better than spherical particles, like calcium carbonate. Details of this generalization can be seen on the attached Table 6.

Using the control polymers described above, blends were prepared using varying amounts of mica, glass fiber, mica/glass fiber blend, ceramic fiber, calcium carbonate and mineral filler. The neat polymer was blended with the weight percent of reinforcing component indicated in Table 6 using a 30 mm twin screw extruder similar to the one described in the above Illustrative Embodiments. The blended samples were extruded, pelletized and formed into family test bars for testing in a manner identical to the neat polymer controls.

The different reinforcing components had different effects on the cycle time needed for molding and the ultimate processability of the neat polyketones. For example, mica had a clear positive effect on melt processability, while Kaolin clay had a negative effect on melt processability. Microwhite, which was calcium carbonate, additionally modified with stearic acid, had improved short term melt processability but decreasing effectiveness over time. Clearly, these three reinforcing components were not alike in their effect on the novel linear alternating polyketone polymer.

The differing reinforcing components had different responses with the polyketone in view of the moldability of the polymer. In particular, from best to worst, mica/glass/polyketone blends exhibited very good thermostability and therefore good moldability, glass fiber/polyketone blends were next in good results, followed very closely, almost at the same level by ceramic fiber/polyketone blends, and finally particulate mineral filled polyketone blends.

The differing reinforcing components had different effects on the polyketone polymer's heat deflection temperature. From best to worst, were the glass fiber combination followed by mica/glass, then mica fibers, followed by ceramic fibers and finally mineral fillers, as shown in the data of Table 6.

Lastly, different reinforcing components affected the polyketone's ability to warp. From most "resistant to warpage" to least "resistant to warpage" were the components, mica, mica/glass fibers, mineral fillers, and calcium carbonate. Glass fibers and ceramic fibers did not provide warpage control, and in fact, they made the polyketone molded articles warp worse then they warped in neat form.

Mica was unlike other types of reinforcing components when used in association with the novel polygons of polyketone. The mica improved the modulus, stress at yield, and reduced elongation of the polyketone. Further, the addition of mica appears prevented stress whitenings. Mica further controlled warpage by disturbing the normal polyketone molecular orientation though its interaction with the platelets.

Ceramic fiber/polyketone blends uniquely had shorter cycle times than other polyketone polymer/-reinforcing component blends. Ceramic fibers improved the processability of the neat polymer. Ceramic fibers allowed repeated melt extrusion of the blend without harming additional polyketone polymer properties.

Glass fiber was a material unique in its interaction with polyketones. Glass fiber not only improved mold shrinkage of the polymer by decreasing shrinkage, but improved the notched izod and modulus of the resultant blend, in comparison to mineral fillers particularly when glass fibers were used in the 10–30% range. However, glass fibers provided limited improved polymer viscosity over time.

Mineral fillers were unlike other reinforcing components, because of their own unique chemical interactions with the polyketone. Among their unique interactions, certain mineral fillers, like Wollastinite improved melt viscosity, and melt stability of the polymer in view of the control.

TABLE 6

| | Flex Modulus (psi) | Tensile Strength (psi) | Notched Izod Room Temperature (ft-lb/in) | Notched Izod −20° F. (ft-lt/in) | Cycle Time[1] process-ability | Mold[2] Shrink | Heat[3] Deflection Tempera-ture (°F.) | Warpage[4] |
|---|---|---|---|---|---|---|---|---|
| Controls | | | | | | | | |
| Control A[5] | 240,000 | 7000–8000 | 4.8 | 1.2 | — | — | — | — |
| Control B[6] | 263,000 | ~7000–8000 | 3.0 | — | — | — | 205 | — |
| Control C[7] | ~200,000–250-000 | 7000–8500 | ~4.3 | ~1.1 | — | ~2.9 | — | — |
| Mica[8] Blends | | | | | | | | |
| 10 wt %[13] | ~310,000 | ~8500 | 0.6–.75 | — | short & good | somewhat | ~250–260 | best when compared with control |
| 1 wt %[13] | ~265,000 | ~6500 | ~3.75–5 | — | short & good | somewhat | | best when compared with control |
| Glass Fiber[9] Blends | | | | | | | | |
| w/polar sizing 9.9 wt %[5] | 304,000 | 10,300 | 2.1 | 0.9 | — | 1.02 | — | worse than control |

TABLE 6-continued

| | Flex Modulus (psi) | Tensile Strength (psi) | Notched Izod Room Temperature (ft-lb/in) | Notched Izod −20° F. (ft-lt/in) | Cycle Time[1] process-ability | Mold[2] Shrink | Heat[3] Deflection Tempera-ture (°F.) | Warpage[4] |
|---|---|---|---|---|---|---|---|---|
| w/o polar sizing 9.9 wt %[5] | 230,000 | 8300 | 1.7 | 0.8 | — | 1.75 | — | worse than control |
| (causes anisotropic effects due to orientation of fiber) | | | | | | | | |
| Mica/Glass Fiber[10] Blends | | | | | | | | |
| 10 wt % mica + 5 wt %[6] | 400,000 | 8200–7500 | 1.8 | 0.9 | | 2.1 | 240 | some good results in view of control |
| Ceramic Fiber[11] Blends | | | | | | | | |
| 10 wt %[5] | — | — | — | — | 5 sec. | lots of shrinkage[2] | — | worse than control |
| 5 wt %[5] (causes non-linear aspect ratio-orients polymer molecules in flow direction) | 322,000 | — | 2.5 | — | — | — | — | — |
| Calcium Carbonate[12] Blends | | | | | | | | |
| 10 wt %[13] | 305,000 | 9366 | — | — | — | good + short[3] | — | — |
| Mineral filler Blends | | | | | | | | |
| 10 wt % Wollasitinite[13] | 301,000 | 8500–9200 | — | — | — | good when compared with control | — | good control |

[1]Amount of time it takes to process the polymer through a mold cycle.
[2]Mold shrinkage is determined by measuring by inspection of edge gated rectangular plaques over time.
[3]°F. at 264 psi.
[4]Warpage is a visual inspection test, when polymer refuses to hold shape warpage occurs.
[5]Using EP terpolymer MP 220, LVN 1.96 at 60° C. m-cresol.
[6]Using 33/67 blend of EP terpolymers 88/005 + 88/006, blend has mp 220-223, LVN 1.73.
[7]EP, mp 223, LVN 1.73 = 88/008.
[8]mica in particular Asprapearl was used with EP polymer having an LVN of 215-14 220° C.
[9]Owens Corning Fiberglass 492 polar sized glass fiber and OCF457 was non-polar sized glass fibers were used.
[10]Using 37/67 blend of 88/005 + 88/006 + 2 wt % processing aid EAA + 2.5 wt % pigment.
[11]Fiberfrax ® 6000 RPS ceramic fiber not ground, long fibers from Standard Oil Engineered Material Co. was used.
[12]Calcium carbonate used herein was microwhite, a $CaCo_2$ with stearic acid added.
[13]Using EP terpolymer MP223 LVN 1.73 = 88/008 and Vansil as Wollastinite.

What is claimed is:

1. A polymeric composition comprising an amount of a linear alternating polymer of carbon monoxide and at least one ethylenically unsaturated hydrocarbon with an amount of glass fiber reinforcement, wherein the glass fibers have a diameter from about $2\times10^{-4}$ inch to about $8\times10^{-4}$ inch and a length from about 0.1 inch to about 0.5 inch.

2. The composition of claim 1 wherein the glass fiber reinforcement is present in an amount from about 1% by weight to about 45% by weight, based on the total composition.

3. The composition of claim 2 wherein the ethylenically unsaturated hydrocarbon is ethylene.

4. A polymeric composition comprising a linear alternating polymer of the formula $$\left[\overset{O}{\overset{\|}{C}}\left(C_2H_4\right)\right]_x\left[\overset{O}{\overset{\|}{C}}\left(B\right)\right]_y$$

wherein B is the moiety of an ethylenically unsaturated hydrocarbon of at least 3 carbon atoms polymerized through the ethylenic unsaturation, the ratio of y:x is no more than about 0.5, and a quantity from about 1% by weight to about 45% by weight, based on total composition, of fibrous glass reinforcement is incorporated therein.

5. The composition of claim 4 wherein the quantity of fibrous glass reinforcement is from about 5% by weight to about 35% by weight, based on total composition.

6. The composition of claim 5 wherein the ethylenically unsaturated hydrocarbon is an alpha-olefin having from 3 to 10 carbon atoms.

7. The composition of claim 6 wherein the alpha-olefin is propylene and the ratio of y:x is from about 0.01 to about 0.1.

8. The composition of claim 5 wherein y is zero.

9. As an article of manufacture, a molded article comprising the composition of claim 1.

* * * * *